June 18, 1929.  E. J. TESORONI  1,718,089
OFFSET BORING HEAD
Filed Oct. 10, 1927
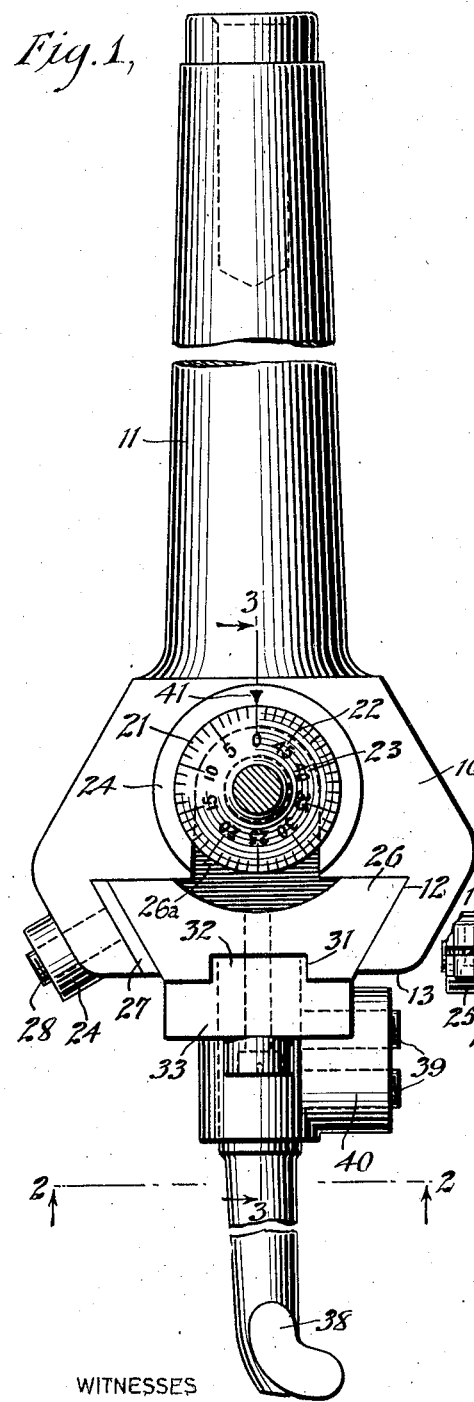
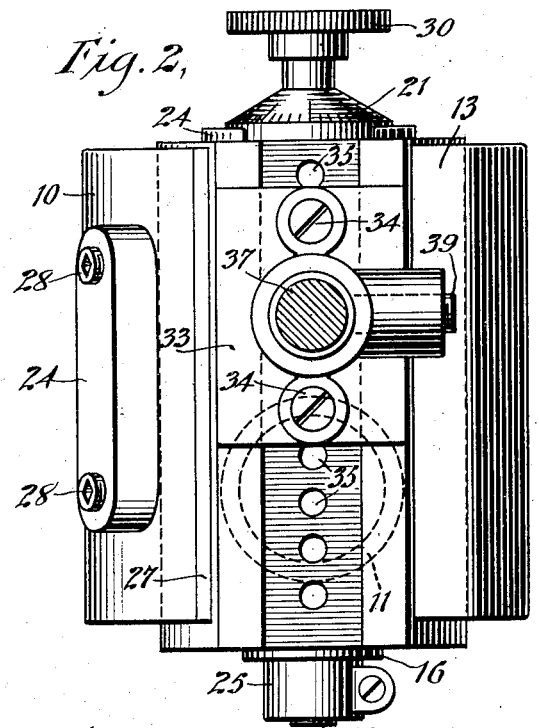
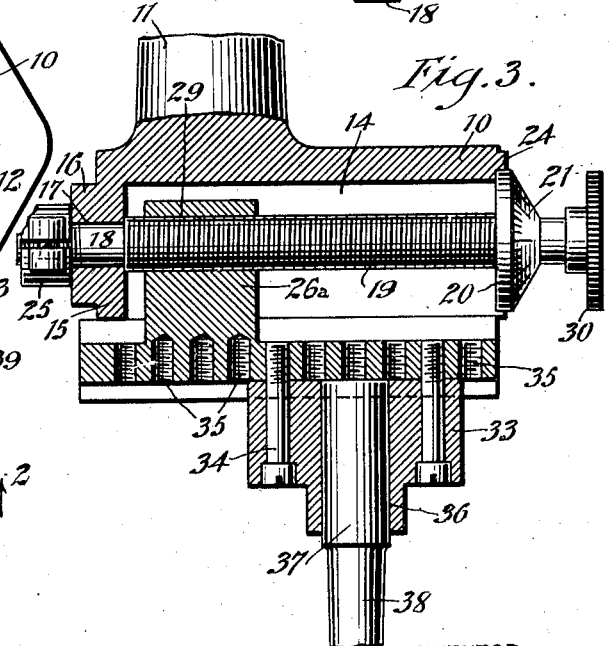
WITNESSES
Edv. Thorpe
Hugh H. Ott
INVENTOR
E. J. Tesoroni
BY
Munn & Co.
ATTORNEY Patented June 18, 1929.

1,718,089

UNITED STATES PATENT OFFICE.

EDGAR J. TESORONI, OF NEWARK, NEW JERSEY.

OFFSET BORING HEAD.

Application filed October 10, 1927. Serial No. 225,346.

This invention relates to metal-working tools and accessories and has particular reference to an improvement in offset boring heads.

At the present time offset boring heads which are on the market and in general use are greatly restricted in their range of adjustment so that the same head may be employed for the boring and re-boring of holes which vary only approximately one inch in size.

One of the principal objects of the present invention is to provide an improved adjustable offset bearing head which admits of a wide range of adjustment, whereby the boring or re-boring of holes from practically the smallest to the largest diameter may be accomplished by the same head.

The invention furthermore comprehends in an adjustable offset boring head, an improved means of adjustment which insures accuracy and precision in the work accomplished thereby.

Other objects reside in the simplicity and rigidity of construction of the boring head, the economy with which the same may be produced, and the general efficiency derived therefrom.

With the above recited and other objects in view, reference is had to the following description and accompanying drawings in which there is exhibited one example or embodiment of the invention, while the appended claims define the actual scope of the invention.

In the drawings—

Figure 1 is a plan view of a boring head constructed in accordance with the invention;

Fig. 2 is an end view thereof with the tool cut in section, on the line indicated at 2—2 in Fig. 1.

Fig. 3 is a fragmentary transverse sectional view taken approximately on the line 3—3 of Fig. 1 and on a slightly reduced scale relative to said figure.

Referring to the drawings by characters of reference, 10 designates the boring head which is offset with respect to the shank 11 and which is provided with a dovetail groove 12 opening through its end face 13. Rearward of the dovetailed groove is a parallel recess 14 which communicates with the dovetailed groove and which opens through one of the side surfaces while the remaining end of the recess is closed by a side wall 15 having a boss 16 through which wall and boss an opening 17 extends to constitute a bearing for the reduced terminal 18 of a threaded shaft 19. The opposite end of the threaded shaft has secured thereto a bearing disk 20 having a conical dial face 21 inscribed with graduations 22 and indicia 23. The periphery of the disk is mounted for turning movement in a bearing boss 24 which supports the opposite end of the screw-threaded shaft 19 for turning movement, it being understood that the shaft 19 extends axially through the recess 14. The reduced end of the shaft which protrudes beyond the bearing boss 16 has mounted thereon a clamp collar 25. A slide 26 of dovetailed shape is mounted for sliding movement in the dovetailed groove 12 and a shim 27 is interposed between one of the angular walls of the dovetailed slide and groove. A pair of set screws 28 are threaded through a boss 29 of the head 10 to engage the shim 27 for taking up wear on the engaging surfaces of the shim and slide. The slide 26 is provided with a lug $26^a$ which projects inwardly into the recess 14 and is provided with a threaded bore 29 which is engaged by the threaded shaft 19, whereby turning movement of the shaft by a manipulating knob 30, effects slidable adjustment of the slide 26 with respect to the head 10. On its outer face the slide 26 is provided with a groove 31 which receives the tongue 32 of a tool holder 33. The tool holder is adjustably and removably associated with the slide by screws 34 which extend therethrough and are selectively anchored in the threaded openings 35 provided in the inner face of the slide groove 31. The tool holder is formed with a socket opening 36 for the reception of the shank 37 of the cutting tool 38 and set screws 39 are threaded through a boss 40 on the tool holder for engagement with the tool shank 37 to retain the same in place.

Under this construction and arrangement it is obvious that a wide range of adjustment of the tool with respect to the offset shank 11 of the boring head may be accomplished and accuracy and precision of adjustment may be obtained by reading the graduations and indicia with respect to the indicator mark 41 on the face of the boss 24.

What is claimed is:

1. A boring head including a shank, a head offset with respect to the shank, a slide block slidably adjustable laterally in said head, a tool-holder and means for selectively connecting the same to the slide block at various longitudinal positions with respect thereto.

2. A boring head including a shank, a head offset with respect to the shank, said head having a dovetailed groove, a dovetailed slide block slidable in the groove for lateral adjustments, a threaded shaft swiveled in the head and engaging a portion of the slide block for effecting sliding adjustment of the block in the head, a groove in the slide block, threaded apertures in the grooved portion of the slide block, a tool-holder having a tongue engaging in the slide block groove, and anchoring screws extending through the tool-holder and selectively engageable in the threaded apertures for effecting an initial longitudinal adjustment of the tool-holder with respect to the block.

Signed at New York, in the county of New York and State of New York, this 8th day of October, A. D. 1927.

EDGAR J. TESORONI.